INVENTOR.
ROBERT W. DELISLE

Nov. 2, 1971  R. W. DE LISLE  3,616,511
COILFORM ORIENTER

Filed Dec. 15, 1969  3 Sheets-Sheet 2

INVENTOR.
ROBERT W. DELISLE
BY
ATTORNEYS

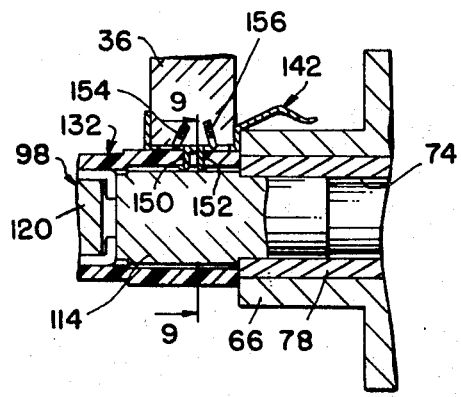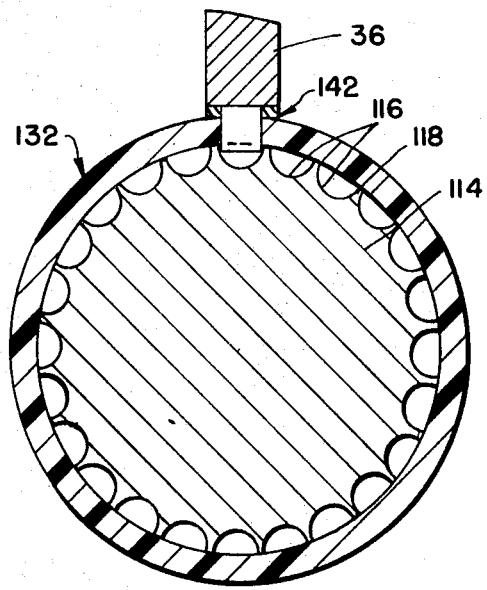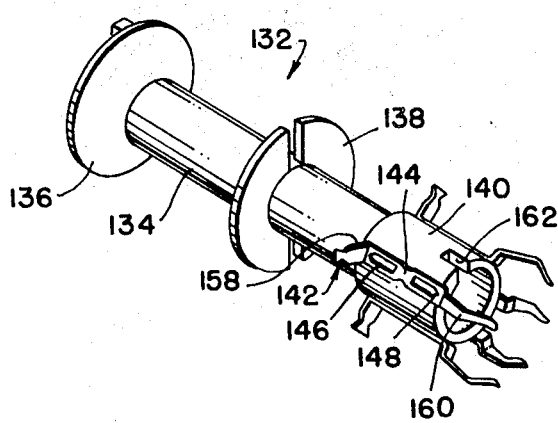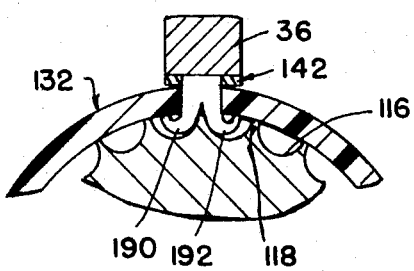

United States Patent Office 3,616,511
Patented Nov. 2, 1971

3,616,511
COILFORM ORIENTER
Robert W. De Lisle, Dover, Pa., assignor to
Berg Electronics, Inc. New Cumberland, Pa.
Filed Dec. 15, 1969, Ser. No. 885,305
Int. Cl. H05k 13/04; H01r 43/04
U.S. Cl. 29—203 R
12 Claims

ABSTRACT OF THE DISCLOSURE

A machine is provided for successively staking terminals onto a tubular coilform. The coilform is of the type used in electrical apparatus. The machine includes a mandrel structure including an outer mandrel shaft for indexing the coilform during the staking operation and an inner mandrel shaft to initially receive the coilform and turn it to a position where a slot in the coilform will engage a finger on the outer mandrel shaft to thereby orient the coilform with respect to the outer mandrel shaft and lock the coilform to the outer mandrel shaft for rotation therewith.

BACKGROUND OF THE INVENTION

Staking machines of the general type contemplated by the present invention have been utilized in the past. Such staking machines include a punch press for successively staking terminals onto one end of a coilform from a continuous terminal strip which is fed into the machine.

One problem in connection with such machines has been the automatic loading of coilforms onto the mandrel of the machine. The coilform must be secured to the mandrel for rotation therewith during the staking operation in a particular angular position so that the terminals will be staked onto the coilform in the proper angular position. In previous machines it has generally been necessary to hand load and orient the coilforms. Such handloading is, of course, time-consuming resulting in relatively high labor costs. The present invention provides an orienting structure which automatically orients a coilform onto a mandrel in the desired angular relationship therewith. This permits high speed mass production techniques to be employed, thus lowering the per unit labor cost for each completed coilform.

SUMMARY OF THE INVENTION

A machine for staking terminals onto a tubular element is provided. The machine includes a mandrel structure for receiving and orienting a tubular element having a slot in one end thereof to a predetermined angular position on the mandrel with respect to the slot preparatory to a staking operation. The mandrel structure comprises an outer mandrel shaft with means journaling the outer mandrel shaft for rotation. The outer mandrel shaft has opening means therein. An inner mandrel shaft is rotatably received in the opening means. First power means are provided to rotate the outer mandrel shaft and second power means are provided to rotate the inner mandrel shaft. A portion of said inner mandrel shaft projects out of the outer mandrel shaft to receive a tubular element. A movable finger is carried by the outer mandrel shaft. Biasing means normally project the finger outwardly of the end of the outer mandrel shaft. The finger is moved inwardly from the end of the outer mandrel shaft against the action of the biasing means upon insertion of the tubular element onto the outwardly projecting portion of the inner mandrel shaft in pressure contact with the end of the finger and with the slot of the tubular element out of registry with the finger. The finger is biased into the slot upon rotation of the inner mandrel shaft and tubular element by the second power means to place the slot in registry with the finger to thereby lock the tubular element to the outer mandrel shaft for rotation therewith by the first power means.

In the drawings:

FIG. 8 is a view similar to FIG. 7 illustrating the staking of a terminal onto the coilform;

FIG. 9 is a sectional view taken substantially along the line 9—9 of FIG. 8 looking in the direction of the arrows illustrating staking of a terminal into a groove of the coilform holder;

FIG. 10 is a view similar to FIG. 9 illustrating a terminal being staked with a ridge of the coilform holder located directly therebeneath; and FIG. 11 is a view in perspective of a coilform upon which terminals have been staked.

Figure 1:
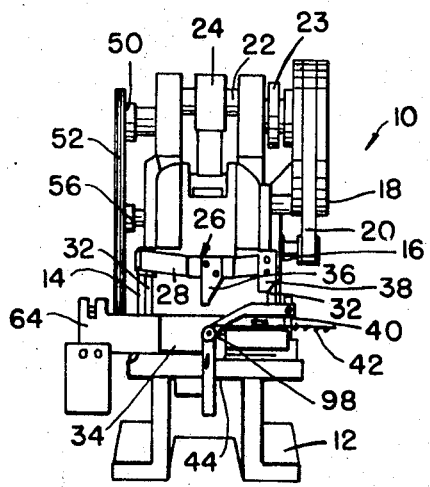
FIG. 1 is a view in perspective of a staking machine employing the coilform orienter forming one embodiment of the present invention.

Referring first to FIG. 1, it will be noted that the staking machine 10 comprising a punch press which includes a support base 12 and vertical support structure 14. An electric motor 16 is carried on the support structure 14. The motor 16 is drivingly connected to the flywheel 18 by means of a belt 20. The flywheel is freely rotatable on a crankshaft 22. A solenoid-actuated clutch 23 is provided to drivingly connect the flywheel 18 to the crankshaft 22. The clutch is actuated at suitable points in the cycle of operation of the machine.

The crankshaft 22 drives a ram 24. The ram 24 carries a die set 26 which includes an upper portion 28 and a lower portion 30 (FIG. 3) interconnected by posts 32. The posts 32 are guided in support openings provided in the support structure 34 carried on the base 12. The upper die set portion 28 carries a terminal severing and staking tool 36 and a cam 38. The cam 38 functions to drive a feeder arm 40 rearwardly upon downward movement of the die set. The feeder arm 40 is spring urged to the position illustrated in FIG. 1 and upon raising of the die set pulls a chain form 42 of terminals forwardly and positions the forwardmost terminal properly for a staking operation. The lower die set portion 30 carries a coilform ejector mechanism 44 which functions to eject coilforms after the proper number of terminals have been staken thereon.

Figure 2:
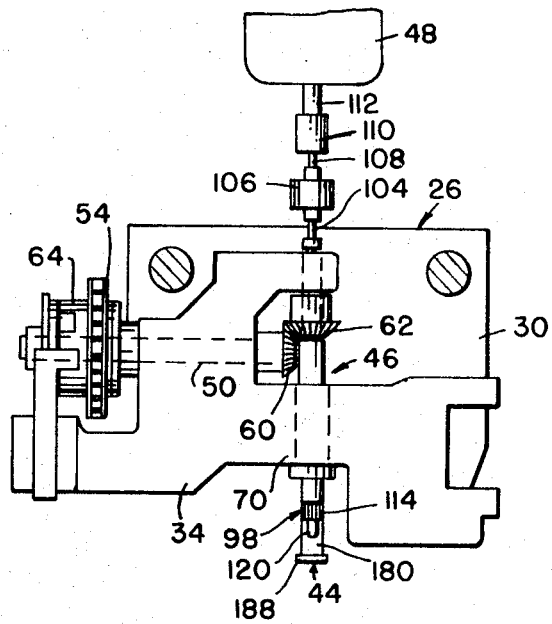
FIG. 2 is a top plan view of the lower portion of the machine of FIG. 1 illustrating the coilform orienter and illustrating coilform loading structure.

A mandrel structure 46 is provided in the support structure 34. The mandrel structure 46 functions to receive a coilform, orient the coilform, lock the coilform against rotation and retain the coilform during the staking operation. The mandrel structure 46 has moving portions which are driven by separate sources of power. One source of power is an electric motor 48 (FIGS. 2 and 3) mounted rearwardly of the mandrel structure. The other source of power is the electric motor 16. The crankshaft 22 carries a drive sprocket 50 on one end. The sprocket 50 drives a chain 52 which is connected to a driven sprocket 54 (FIG. 2). An idler sprocket 56 is provided intermediate the sprockets 50, 54. The sprocket 54 is connected to a shaft 58 which is suitably journaled in support structure 34. A bevel gear 60 on the end of the shaft 58 meshes with a bevel gear 62 provided on the mandrel structure 46. An indexing structure 64 is provided to incrementally cause driving of the mandrel structure in accordance with the requirements of the particular staking operation. A suitable indexing structure is illustrated in copending commonly assigned application Ser. No. 679,675, filed Nov. 1, 1967.

The mandrel structure is illustrated in FIGS. 2-9. The mandrel structure 46 includes an elongated outer mandrel shaft 66 having a central opening therethrough. A peripheral flange 68 is provided adjacent the forward end of the shaft 66. The flange 68 abuts against the portion 70 of support structure 34. An opening is provided in portion 70 with a suitable bearing 72 to rotatably mount the outer mandrel shaft.

The opening through the outer mandrel shaft includes an enlarged portion 74 adjacent the forward end thereof. A portion 76 of the opening of reduced diameter extends from the portion 74 to the rearward end of the outer mandrel shaft. A sleeve 78 is received within the enlarged portion 74. The sleeve is biased to the forward position by means of a coil spring 80 which abuts against a thrust washer 82 at the rear end of the portion 74.

A set screw 84 threadingly engages a threaded opening 86 provided in the flange 68 of the mandrel shaft. As may be best seen in FIG. 7, the set screw 84 has a projecting pin 88 on the inner end thereof which is received in a longitudinally extending slot 90 provided in the sleeve 78. The slot 90 permits limited forward and rearward travel of the sleeve.

A finger 92 is mounted in a slot 94 provided on the forward end of the sleeve 78. The finger 92 extends forwardly of the end of the sleeve. An inclined surface 96 is provided on the reverse side of the finger 92.

An inner mandrel shaft 98 is rotatably received within the sleeve 78. The inner mandrel shaft has enlarged shaft portions 100, 102 which bear against the interior surface of the sleeve 78. The spring 80 fits around the portion 102. The rear end of the portion 102 abuts against the thrust washer 82. A shaft portion 104 of reduced diameter is secured at its forward end to the enlarged portion 102. The portion 104 extends through the opening 76 in the mandrel shaft and terminates exteriorly of the outer mandrel shaft. The outer end of portion 104 is connected to a slip-clutch 106, the slip-clutch 106 applying a frictional turning force to the inner mandrel shaft to cause rotation thereof. The clutch may override the inner mandrel shaft when the finger 92 engages a coilform. The motor 48 is run continuously during operation of the staking machine. The clutch 106 is connected via a shaft 108 and coupling 110 to the output shaft 112 of the motor 48.

The forward portion of the inner mandrel shaft 98 extends out of the forward end of the outer mandrel shaft 66. The first section 114 extending externally of the outer mandrel shaft is longitudinally serrated. As will be noted in FIG. 9, the serrations define arcuate grooves 116 provided around the entire periphery of the portion 114. The grooves 116 are spaced apart from each other a slight distance and define therebetween ridges 118. The section 114 serves as a means for mounting a coilform and as an anvil for bending a portion of a terminal during staking thereof onto a coilform. Both the grooves 116 and the ridges 118 may be used in the terminal bending operation depending upon the position of the coilform with respect to the section 114 as will be hereinafter described.

A portion 120 of slightly smaller diameter than the section 114 extends forwardly therefrom and terminates in a rounded nose 122. The function of the portion 120 is to receive and guide a coilform onto the mandrel. A U-shaped spring 124 is received on the portion 120 in longitudinal grooves provided in the periphery thereof. A diametrically extending opening 126 is provided adjacent the portion 114 to receive feet 128, 130 of the spring 124. This permits the spring to be fixed radially inwardly when a coilform is inserted thereon. The spring thus exerts a frictional pressure against the interior periphery of the coilform holding the coilform for rotation with the mandrel.

Before considering the method of operation of the described mechanism, the type of coilform operated on thereby should first be described. The coilform 132 is illusttrated in FIG. 11. As will be noted, the coilform 132 includes an elongated tubular member 134 having spaced apart discs 136, 138 secured thereto. The end 140 is slightly enlarged and the terminals 142 are staked thereon. Such coilforms are commonly used in the electronics and electrical industries. Leads or other electrical devices may be mounted and received in the space between the discs 136, 138. Leads extend from this portion into connection with the terminals 142. It will be noted that the terminals 142 comprise a central portion 144 having a pair of openings 146, 148 therein which are formed during fabrication of the terminals. A pair of tangs 150, 152 (FIG. 8) are formed by punches and extend downwardly at substantially right angles to the central portion 144. The openings 146, 148 are conveniently utilized for manipulation of the terminals by means of the tool 36 which has fingers 154, 156 which engage a terminal via the openings as may be seen in FIG. 8. The end portion 158 of each terminal is bent outwardly at substantially right angles and is generally used for attachment of leads thereto. The forward portion 160 of each terminal extends forwardly from the coilform and is configured to be received in sockets of an electronic device. The forward portions thus serve as prongs for mounting the coilform. An orienting slot 162 is provided in the forward end of the coilform and is utilized to properly orient the coilform onto the mandrel for the staking operation.

Operation of the machine may now be understood by reference to FIGS. 1-9. As illustrated in FIG. 2, a coilform 132 is loaded onto a support 164 with the end 140 pointed towards the mandrel 98 and the opposite end in alignment with a loading plunger 166. The coilforms may be loaded onto the support 164 in any conventional manner as by gravity feed or the like from a supply hopper. The plunger 166 is journaled in a bearing 168 and is reciprocated by means of a double-acting fluid cylinder 170. A disc 172 is provided adjacent the forward end of the plunger 166 to contact the outer end of the coilform and drive it towards and onto the mandrel 98 upon actuation of the cylinder 170 to extend the plunger.

Figure 5:
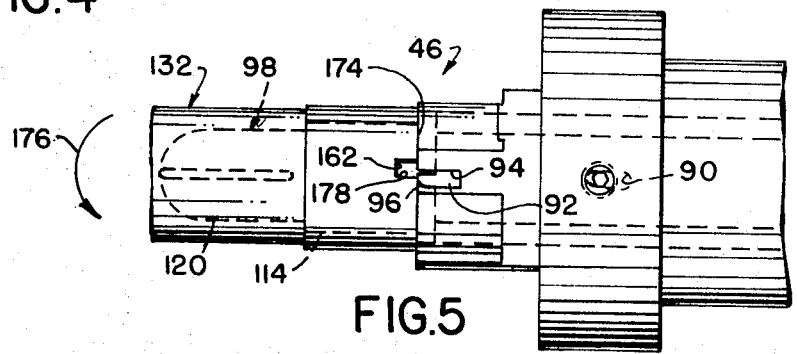
FIG. 5 is a view of the coilform orienter showing a coilform mounted on the coilform orienter mandrel prior to orientation thereof.

The coilform is first received on the portion 120 of the mandrel, the rounded nose serving to guide the coilform onto the mandrel. The forward portion 140 of the coilform is snugly received on the serrated portion 114 of the mandrel. The coilform is frictionally held on the mandrel by means of the spring 124 and serrated portion 114. Initially, as shown in FIG. 5, the forward edge 174 of the coilform will contact the finger 92 and drive the sleeve 78 into the mandrel structure, compressing the spring 80. The extent of inward movement of the sleeve is determined by the length of the slot 90. This action assumes that the slot 162 is out of registry with the finger 92 which is the usual case. In the event that there is initial registry of the finger and slot, the finger will of course enter the slot.

Figure 6:
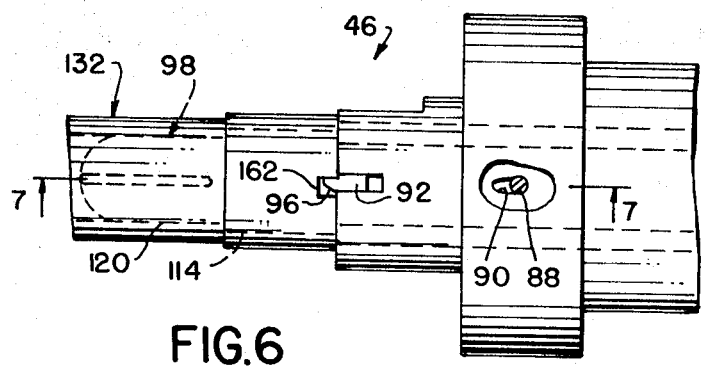
FIG. 6 is a view similar to FIG. 5 illustrating the coilform after orientation thereof.
Figure 7:
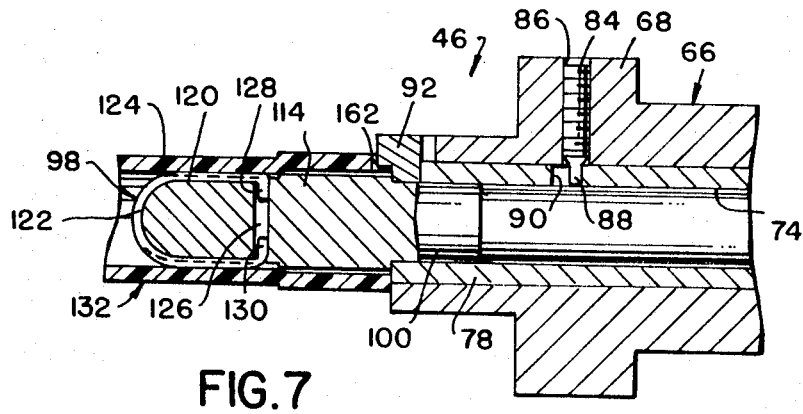
FIG. 7 is a sectional view taken substantially along the line 7—7 of FIG. 6 looking in the direction of the arrows.

The motor 48 causes turning of the inner mandrel shaft thus rotating the coilform 132. The direction of rotation of the coilform 132 is indicated by the arrow 176 of FIG. 5. As may be appreciated from FIGS. 5 and 6, the finger 92 is held back until the forward edge 178 of the slot 162 is in alignment with the surface 96 of the finger 92. As soon as the edge 178 contacts the surface 96, the finger 92 is free to move forwardly. The finger 92, in its forward movement may cam the coilform 132 a slight degree in the same direction as the direction of rotation thereof, thus permitting complete insertion of the finger 92 as shown in FIG. 6 when the solt 162 is in complete alignment with the finger. This results in proper orientation of the coilform 132 with respect to the mandrel strcture and locks the coilform to the outer mandrel shaft. The action of orientation is very rapid, the motor 48 running at a high speed, as for example at 1500 r.p.m. After the finger 92 has entered the slot 162, rotation of the coilform by means of the motor 48 ceases, the clutch 106 permitting the motor 48 to be run continuously upon such cessation of rotation.

The staking cycle is initiated subsequent to proper orientation of the coilform 132. Referring to FIG. 1, the outer mandrel shaft 66 is caused to rotate from station to station, a terminal being staked onto the coilform at each station. The mechanism 64 causes indexing of the outer mandrel shaft via gears 60, 62 and also actuation of the ram 24 to move the die set 26 and tool 36 downwardly at each station to cause staking of a terminal onto the coilform. The coilform 132 illustrated in FIG. 11 representatively has five terminals 142 stacked thereon. However, the number of terminals and the location of each terminal may be varied in accordance with the requirements of the particular coilform.

The actual staking operation is best illustrated in FIGS. 1, 8 and 9. As there shown, the tool 36 descends severing the foremost terminal 142 from the terminal strip 42 and driving the terminal into the coilform 132. The tangs 150, 152 pierce the plastic insulating material from which the coilform 132 is fabricated. Upon passing through the wall of the coilform, the tangs 150, 152 will normally enter one of the grooves 116 in the portion 114 of the mandrel and be bent outwardly as illustrated in FIG. 8 to firmly anchor the terminal onto the coilform.

Figure 3:
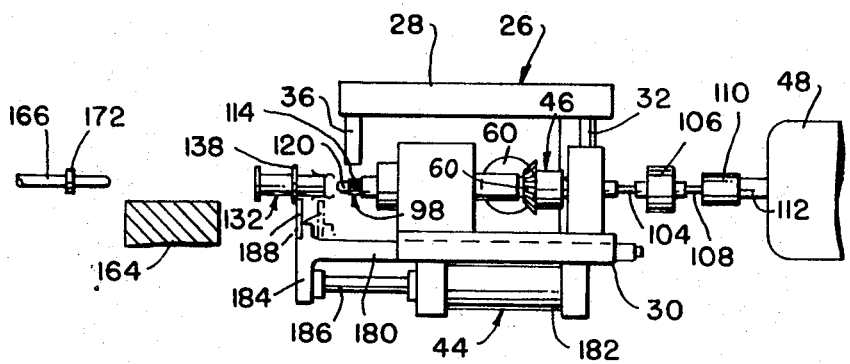
FIG. 3 is a side elevational view of the structure of FIG. 2.
Figure 4:
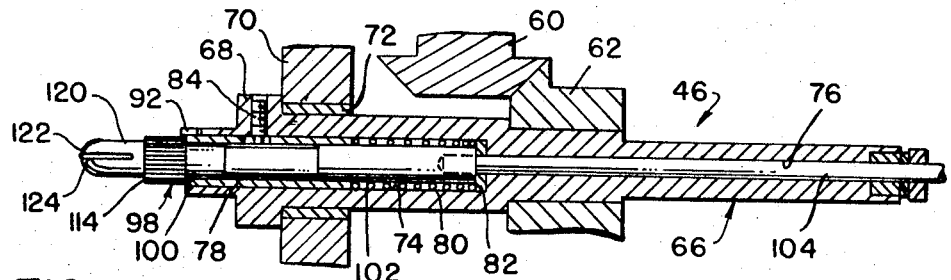
FIG. 4 is a longitudinal sectional view illustrating the coilform orienter structure.

After all of the terminals have been staked onto the coilform, the coilform is automatically ejected from the mandrel by means of ejector mechanism 44 illustrated in FIGS. 1–3. The ejector mechanism includes an ejector bar 180 which is slidably mounted in a longitudinal slot provided on the underside of the lower die portion 30. A double-acting fluid cylinder 182 is mounted beneath the bar 180. The bar 180 has an enlarged portion 184 at the forward end thereof which is secured to the forward end of the cylinder plunger 186. An ejector plate 188 is carried on the forward end of the bar 180. The plate 188 in its retracted position, as illustrated in dotted lines in FIG. 3, is located forwardly of the coilform disc 138. Upon actuation of the cylinder 44 the bar 180 is moved forwardly whereupon the plate 188 contacts the disc 138 and drives the coilform off the mandrel whereupon it will fall by gravity to a collecting station for subsequent storage or packaging.

FIG. 10 illustrates a staking operation wherein the tangs of the terminal 142 are in alignment with a ridge 118 rather than a groove 116. When this occurs, the tanks split into two halves 190, 192 and are turned up to stake the terminal firmly onto the coilform. In actual practice, this results in a superior mechanical connection although either staking as shown in FIG. 9 or staking as shown in FIG. 10 results in a satisfactory mechanical connection.

What I claim as my invention is:

1. In a machine for staking terminals onto a tubular element, a mandrel structure for receiving and orienting a tubular element, which has a slot in one end thereof, to a predetermined angular position on the mandrel with respect to the slot preparatory to a staking operation, said mandrel structure comprising an outer mandrel shaft rotatably mounted in the machine, an inner mandrel shaft rotatably mounted in the outer mandrel shaft, a portion of said inner mandrel shaft projecting out of the outer mandrel shaft to receive a tubular element, a movable finger carried by the outer mandrel shaft, biasing means normally projecting the finger outwardly of the end of the outer mandrel shaft, said finger being moved inwardly from the end of the outer mandrel shaft against the action of the biasing means upon insertion of a tubular element onto the projecting end of the inner mandrel shaft in pressure contact with the finger and with the slot of the tubular element out of registry with the finger, said finger being biased into said slot upon rotation of the inner mandrel shaft and tubular element to place the slot in registry with the finger and thereby lock the tubular element to the outer mandrel shaft for rotation therewith.

2. In a machine for staking terminals onto a tubular element, a mandrel structure for receiving and orienting a tubular element, which has a slot in one end thereof, to a predetermined angular position on the mandrel with respect to the slot preparatory to a staking operation, said mandrel structure comprising an outer mandrel shaft, means in the machine journalling the outer mandrel shaft for rotation, said outer mandrel shaft having opening means therein, an inner mandrel shaft rotatably received in said opening means, first power means to rotate the outer mandrel shaft, second power means to rotate the inner mandrel shaft, a portion of said inner mandrel shaft projecting out of the outer mandrel shaft to receive a tubular element, a movable finger carried by the outer mandrel shaft, biasing means normally projecting the finger outwardly of the end of the outer mandrel shaft, said finger being moved inwardly from the end of the outer mandrel shaft against the action of said biasing means upon insertion of the tubular element onto the projecting end of the inner mandrel shaft in pressure contact with the finger and with the slot of the tubular element out of registry with the finger, said finger being biased into said slot upon rotation of the inner mandrel shaft and tubular element by the second power means to place the slot in registry with the finger and thereby lock the tubular element to the outer mandrel shaft for rotation therewith by the first power means.

3. A machine as defined in claim 2, and further characterized in that said finger has a surface on one side thereof angled towards the other side thereof from a point adjacent said end of the outer mandrel shaft to the outer end of the finger, said surface being located with respect to the direction of rotation of the inner mandrel shaft to engage the forward edge of the slot in a tubular element as it is rotated thereby whereby the finger will enter the slot concurrently with the slot moving into registry with the finger.

4. A machine as defined in claim 2, and further characterized in that said outer mandrel shaft includes a main portion, a sleeve mounted therein and through which the inner mandrel shaft passes, means securing said sleeve against rotation relative to the main portion of the outer mandrel shaft but permitting limited axial motion with respect thereto, said finger being carried on the outer end of said sleeve, said biasing means comprising a spring located within said outer mandrel shaft and in contact with the sleeve.

5. A machine as defined in claim 4, and further characterized in that said means securing the sleeve against rotation with respect to the outer mandrel shaft but permitting limited axial movement with respect thereto comprises a longitudinally extending slot in the sleeve, and a pin on the main portion of the outer mandrel shaft extending into said slot.

6. A machine as defined in claim 2, and further characterized in that said second power means to rotate the inner mandrel shaft comprises an electric motor having an output shaft, and a clutch frictionally coupling the output shaft of the motor to the inner mandrel shaft, said clutch causing rotation of the inner mandrel shaft until said finger engages the slot in the tubular element.

7. A machine as defined in claim 2, and further characterized in that said first power means comprises a main electric motor for driving the machine, power take-off means coupling the outer mandrel shaft to said main motor, and indexing means interposed in the power takeoff means for control of outer mandrel shaft rotation.

8. A machine as defined in claim 2, and further characterized in that the portion of said inner mandrel shaft projecting out of the outer mandrel shaft to receive a tubular element includes a cylindrical section for receiving the forwardmost portion of a tubular element, said cylindrical section having axially extending serrations around the outer periphery thereof defining alternating grooves and ridges, either of said grooves or ridges serving to deform the end of a terminal staked into contact therewith to anchor the terminal to the tubular element.

9. A machine as defined in claim 2, and further characterized in that the forwardmost section of the portion of said inner mandrel shaft which projects out of the outer mandrel shaft to receive a tubular element is rounded for ready insertion into a tubular element to guide the tubular element onto the inner mandrel shaft, and a U-shaped spring element mounted on said forwardmost section with the legs thereof extending axially rearwardly, said spring serving to frictionally engage the inner surface of the tubular element.

10. A machine as defined in claim 2, and further characterized in the provision of power-driven ejection means on the machine to automatically eject a tubular element from the mandrel structure upon the completion of a staking operation.

11. A machine as defined in claim 1, and further characterized in the provision of power-driven loading means on a machine for automatically loading an unstaked tubular element onto the mandrel structure.

12. A mandrel structure for receiving and orienting a tubular element, which has a slot in one end thereof, to a predetermined angular position on the mandrel with respect to the slot, said mandrel structure comprising an outer mandrel shaft, means rotatably mounting the outer mandrel shaft, an inner mandrel shaft rotatably mounted in the outer mandrel shaft, a portion of said inner mandrel shaft projecting out of the outer mandrel shaft to receive a tubular element, a movable finger carried by the outer mandrel shaft, biasing means normally projecting the finger outwardly of the end of the outer mandrel shaft, said finger being moved inwardly from the end of the outer mandrel shaft against the action of the biasing means upon insertion of a tubular element onto the projecting end of the inner mandrel shaft in pressure contact with the finger and with the slot of the tubular element out of registry with the finger, said finger being biased into said slot upon rotation of the inner mandrel shaft and tubular element to place the slot in registry with the finger and thereby lock the tubular element to the outer mandrel shaft for rotation therewith.

References Cited

UNITED STATES PATENTS

| | | | |
|---|---|---|---|
| 3,217,399 | 11/1965 | Spiess et al. | 29—148.4 A |
| 3,365,776 | 1/1968 | Barkalow | 29—149.5 R |
| 3,373,472 | 3/1968 | Moore | 29—148.4 A |

THOMAS H. EAGER, Primary Examiner

U.S. Cl. X.R.

29—203 D